(12) United States Patent
Niessner et al.

(10) Patent No.: US 8,967,341 B2
(45) Date of Patent: Mar. 3, 2015

(54) WHEEL-MOUNTED BRAKE DISKS

(75) Inventors: Matthias Niessner, Ismaning (DE); Peter Seifert, Dietersheim (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 14/119,922

(22) PCT Filed: May 23, 2012

(86) PCT No.: PCT/EP2012/059599
§ 371 (c)(1),
(2), (4) Date: Dec. 23, 2013

(87) PCT Pub. No.: WO2012/160094
PCT Pub. Date: Nov. 29, 2012

(65) Prior Publication Data
US 2014/0131152 A1 May 15, 2014

(30) Foreign Application Priority Data
May 26, 2011 (DE) .......................... 10 2011 102 518

(51) Int. Cl.
| | |
|---|---|
| B60B 17/00 | (2006.01) |
| F16F 7/104 | (2006.01) |
| F16D 65/12 | (2006.01) |
| B61H 5/00 | (2006.01) |

(52) U.S. Cl.
CPC ................ *F16D 65/124* (2013.01); *B61H 5/00* (2013.01)
USPC ................................. 188/218 XL; 188/218 R

(58) Field of Classification Search
USPC ................. 188/205 R, 206 R, 218 R, 218 XL
See application file for complete search history.

(56) References Cited

U.S. PATENT DOCUMENTS

| | | | | |
|---|---|---|---|---|
| 2,485,082 | A | * | 10/1949 | Bachman ................ 188/218 XL |
| 4,006,803 | A | * | 2/1977 | Klein et al. ............. 188/218 XL |
| 5,101,940 | A | * | 4/1992 | Mungo et al. ........... 188/218 XL |
| 5,150,774 | A | * | 9/1992 | Adamson ................ 188/218 XL |
| 5,439,077 | A | * | 8/1995 | Wirth ........................... 188/71.4 |

FOREIGN PATENT DOCUMENTS

| | | |
|---|---|---|
| DE | 2362834 A1 | 6/1975 |
| DE | 2936668 B1 | 1/1981 |
| DE | 3818713 A1 | 12/1989 |

(Continued)

OTHER PUBLICATIONS

Search Report for International Patent Application No. PCT/EP2012/059599; Feb. 6, 2013.
International Preliminary Report on Patentability and Written Opinion of the International Search Authority for International Patent Application No. PCT/EP2012/059599, dated May 23, 2012.

(Continued)

*Primary Examiner* — Christopher Schwartz
(74) *Attorney, Agent, or Firm* — Barnes & Thornburg LLP

(57) ABSTRACT

Wheel-mounted brake disks which are arranged on both sides of a wheel base of a railway wheel and are fastened by through bolts, the bolt head of every through bolt lying in a countersink of one wheel-mounted brake disk and a nut screwed onto the through bolt lying in a countersink of the other wheel-mounted brake disk, each resting either directly or indirectly on the bottom of the countersink. The wheel-mounted brake disks are designed so that every countersink has an undercut portion that extends down to the bottom.

6 Claims, 2 Drawing Sheets

(56) References Cited

FOREIGN PATENT DOCUMENTS

| | | |
|---|---:|---|
| DE | 3839073 A1 | 5/1990 |
| DE | 29604157 U1 | 7/1997 |
| DE | 202009013476 U1 | 2/2011 |
| GB | 2390885 A | 1/2004 |
| JP | 2008157400 A | 7/2008 |

OTHER PUBLICATIONS

English Translation of International Preliminary Report on Patentability and Written Opinion of the International Search Authority for International Patent Application No. PCT/EP2012/059599, dated May 23, 2012.

* cited by examiner

WHEEL-MOUNTED BRAKE DISKS

PRIORITY CLAIM

This patent application is a U.S. National Phase of International Patent Application No. PCT/EP2012/059599, filed 23 May 2012, which claims priority to German Patent Application No. 10 2011 102 518.2, filed 26 May 2011, the disclosures of which are incorporated herein by reference in their entirety.

FIELD

Disclosed embodiments relate to wheel brake disks.

SUMMARY

Disclosed embodiments develop wheel brake disks of the generic type such that, with an optimization of the friction surface area, the service life of the through bolts is increased and thus the operational reliability of the rail wheel as a whole is improved.

The flexibility of the bolted components is improved, that is to say increased, whereby the bolt loading is considerably reduced and the service life of the through bolts is lengthened, without these having the disadvantages associated with the use of spring washers or other elements.

The bore diameter of the depression on the friction surface can, like before, be kept very small, and is determined exclusively by the diameter of the bolt head or of the nut.

The ratio of half of the diameter difference between the depression in the region of the undercut and through bore to the base thickness may be selected to be greater than 1, wherein the base thickness may be reduced to such an extent that the region can still permanently withstand the thermal and mechanical loading of the wheel brake disk. To minimize a notch effect, the transition from the base of the depression to the cylindrical part of the undercut should be realized with a radius which should be selected to be as large as possible.

As mentioned, during a braking operation, the known wheel brake disk bulges outward in the center, with a tensile load being exerted on the through bolts, or deformation into a dish/shield shape occurs, with tensile and bending loads being exerted on the through bolts. The now flexible base can bend elastically and, in functional terms, acts in the manner of a spring element. Even in the case of high loads, the bolted region of the wheel brake disk remains substantially in contact with the wheel body.

Owing to the increased flexibility, the additional force in the bolt is considerably reduced, and the service life of the bolted connection is lengthened. Furthermore, the additional force generated by the thermal expansion of the bolted region is reduced owing to the relatively thin base. The overall result is thus a noticeable lengthening of service life, and an improvement in operational reliability.

Furthermore, the disclosed embodiments can be realized with little outlay in terms of manufacturing, wherein a minimization of costs is attained by virtue of the fact that additional components, such as spring washers or spring elements, can be omitted.

Furthermore, the disclosed embodiments can be used for all types of wheel brake disks, even in conjunction with brake linings with small friction elements.

According to at least one disclosed embodiment, the base thickness may be partially reduced, wherein for this purpose, the base has a concentric recess on the inner and/or outer side.

BRIEF DESCRIPTION OF THE FIGURES

Exemplary embodiments of the invention will be described below on the basis of the appended drawings, in which.

DETAILED DESCRIPTION

Figure 1:
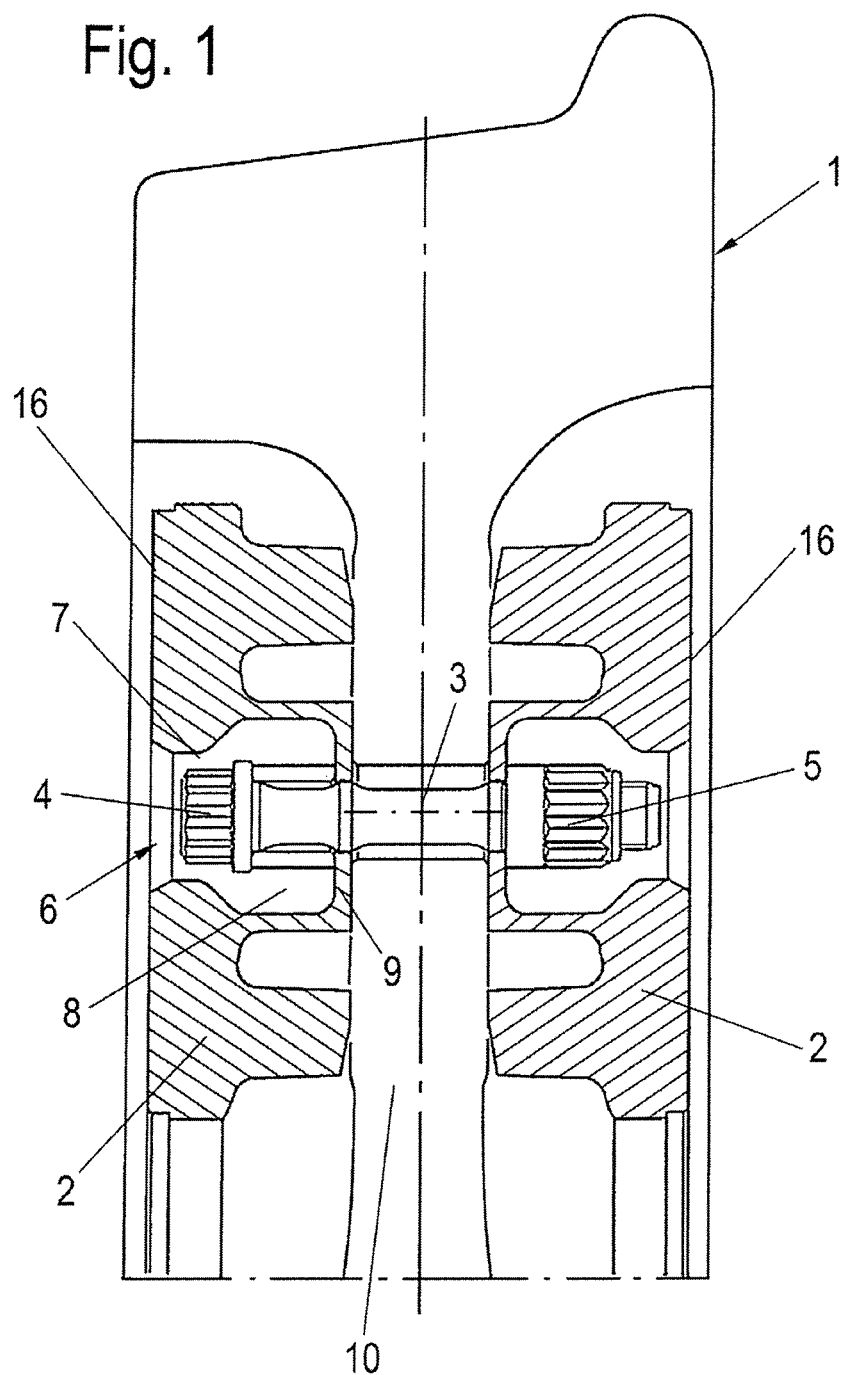
FIG. 1 shows a partial detail of a rail wheel in a cross section.

FIG. 1 shows, in a partial detail, a rail wheel having a wheel body 1 which has a radially inwardly extending web 10, to both sides of which wheel brake disks 2 are fastened by means of through bolts 3. To receive the bolt head 4 on one side and a nut 5 on the other side, a depression 6 for each through bolt 3 is provided in each wheel brake disk 2, the depression 6 merging into a through bore 12 facing toward the web 10, wherein the base of the depression 6 delimits a base 9, which on the other side forms an abutment surface 11 which bears against the web 10 of the wheel body 1.

According to at least one disclosed embodiment, each depression 6 has an undercut 8 which extends as far as the base and which merges, at the side averted from the wheel body 1, into a cylindrical region 7 which forms an insertion opening for the through bolt 3 and which proceeds from a friction surface 16 of the wheel brake disk 2.

The diameter of the cylindrical region 7, which is smaller than the diameter of the undercut 8, is selected to be as small as possible, and is determined exclusively by the associated dimension of the bolt head 4 or of the nut 5 and/or of a tool by means of which the through bolt 3 can be tightened.

As can be seen very clearly in the figures, a transition 13 between the base 9 and the wall of the undercut 8 is highly rounded to eliminate or minimize a notch effect.

Figure 2:
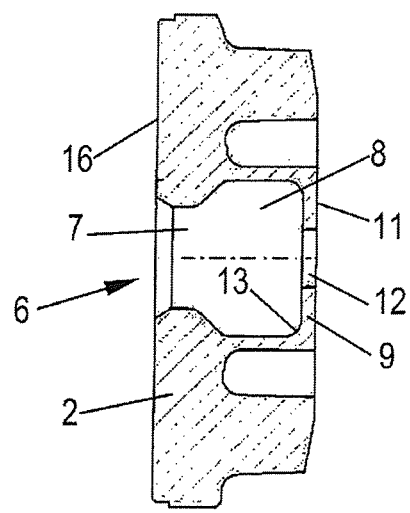
FIGS. 2-4 show, in each case in cross section, an exemplary embodiment of the wheel brake disk.
Figure 3:
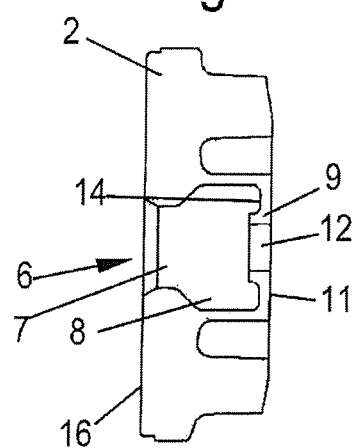
Figure 4:
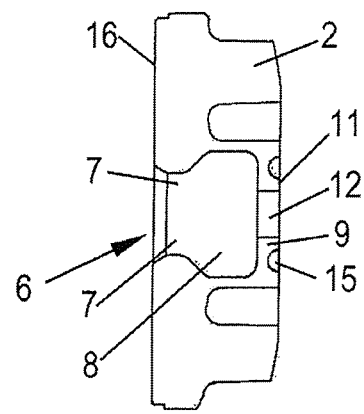

While FIG. 2 shows, as a detail, a cross section through a wheel brake disk 2 as shown in FIG. 1 in the assembled position, FIGS. 3 and 4 show in each case a further exemplary embodiment of a wheel brake disk. Here, the base 9 has concentric recesses 14, 15, wherein, in the variant shown in FIG. 3, the recess is provided on the inner side, that is to say on the side facing toward the undercut 8, whereas the recess 15 is formed as an annular groove into the abutment surface 11 on the outer side.

In the case of known rail wheels, the wheel brake disks connected to both sides of the wheel body are fastened by means of a multiplicity of circumferentially distributed through bolts, wherein the through bolts pass through the wheel body, the head of the respective through bolt lies in a depression of one wheel brake disk, and a nut that is screwed onto the respective through bolt lies in a depression of the other wheel brake disk. The connection of the wheel brake disks to the wheel body may be realized in the region of a wheel hub, of a wheel web or of a wheel rim.

In the case of high-performance modern wheel brake disks, the direct bolted connection of the two wheel brake disks to the wheel web has become established. For the configuration of the bolted connection, a maximum possible bolt length is desired, this being achieved using sleeves under the bolt head, or under the bolt head and under the nut.

It is also known, instead of or in addition to the sleeves, to use spring washers in the form of plate springs, which serve to improve the flexibility of the braced parts to compensate braking-induced deformations of the bolted parts and briefly occurring shocks.

The effect, however, comes at the cost of negative effects that can considerably shorten the service life of the connection. When using the spring washers, the number of bolted joints, and thus possible settling rates, is multiplied.

Furthermore, the spring washers restrict the usage temperature of the wheel brake disks, because the spring washers must not be heated beyond their annealing temperature. The spring washers would otherwise lose their resilient action, reducing the service life of the bolted connection. Also, the use of spring washers leads to an increase in the number of components to be assembled, whereby the risk of incorrect assembly is considerably increased.

Furthermore, the use of spring washers requires a relatively large diameter of the depression, which restricts the possibilities for use of rigid or flexible sintered linings with small friction elements, in particular because the friction elements can become caught on the bore edge and be destroyed.

To minimize the bore diameter, although it has already been proposed to insert press-in bushings into the depression, it is then the case that the brake disk can only be subjected to low thermal loading, for which reason the design has not been proven, that is to say become established, in practice.

Aside from the bolted connection itself, most wheel brake disks have elements for centering on the wheel body, for example in the form of sleeves held in the through bores of the wheel body, which sleeves have peg-shaped ends which engage into grooves of the friction disks.

The diameter of the respective depression should basically be as small as possible, the diameter being just large enough that a tool for tightening the bolted connection can be inserted and that the spring washers, if they are used, can expand. By means of an opening which is small in relation to the friction surface area, it is the intention for the friction behavior to be impaired as little as possible, and for the catching of lining elements to be prevented.

The base of the depression is generally formed, where possible, with a high stiffness, that is to say the base thickness is selected so as to be large in relation to the diameter of the through bore of the respective wheel brake disk. Here, the ratio of half of the diameter difference between the cylindrical depression and through bore to the base thickness in the case of connections without spring washers or spring elements may be less than 1, whereby a rigid abutment surface is provided which practically cannot bend.

During braking, owing to the heating at the surface, the respective wheel brake disk undergoes bulging in cross section, which bulging leads to tensile loading of the through bolt. In the case of the conventional design with a rigid base, the loading directly gives rise to an additional force in the bolt as a result of the deformation and clamping length. The bulging may be so great that the abutment surface by which the wheel brake disk bears against the wheel body is lifted. Aside from the tensile force generated by the bulging, an additional force is also exerted on the through bolt by a deformation of the wheel brake disk into a dish/shield shape that arises during the course of the braking operation or owing to internal stresses.

LIST OF REFERENCE NUMERALS

1 Wheel body
2 Wheel brake disk
3 Through bolt
4 Bolt head
5 Nut
6 Depression
7 Cylindrical region
8 Undercut
9 Base
10 Web
11 Abutment surface
12 Through bore
13 Transition
14 Recess
15 Recess
16 Friction surface

The invention claimed is:

1. Wheel brake disks which are arranged on both sides of a wheel body of a rail wheel and fastened by through bolts, wherein the bolt head of each through bolt lies in a depression of one wheel brake disk, and a nut which is screwed onto the through bolt lies in a depression of the other wheel brake disk, in each case so as to be supported directly or indirectly on the base of the depression, wherein each depression has an undercut extending as far as the base.

2. The wheel brake disks of claim 1, wherein the ratio of half of the diameter difference between the undercut and a through bore to the thickness of the base is ≥1.

3. The wheel brake disks of claim 1, wherein the transition from the base of the undercut to the wall thereof is rounded.

4. The wheel brake disks of claim 1, wherein the base has a portion of reduced thickness on its side facing toward the undercut and/or on the averted side.

5. The wheel brake disks of claim 1, wherein the portion of reduced thickness is formed by a concentric recess.

6. The wheel brake disks of claim 1, wherein the undercut merges, on its side averted from the through bore, into a cylindrical region.

\* \* \* \* \*